(No Model.)
W. J. STOWE.
WHIFFLETREE HOOK.
No. 504,686. Patented Sept. 5, 1893.
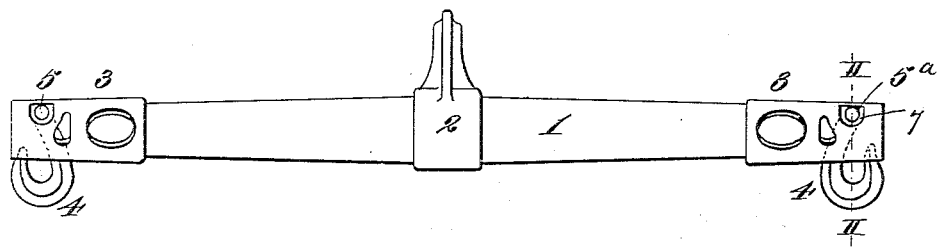
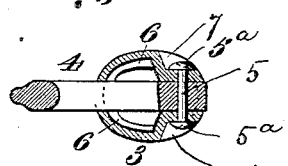
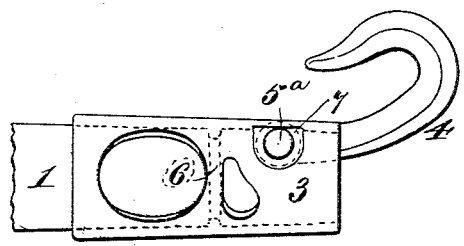
Attest:
E. S. Knight
Albert M. Ebersole
Inventor:
William J. Stowe
By Knight Bros
atty's

UNITED STATES PATENT OFFICE.

WILLIAM J. STOWE, OF KANSAS CITY, ASSIGNOR TO THE NIXDORFF-KREIN MANUFACTURING COMPANY, OF ST. LOUIS, MISSOURI.

WHIFFLETREE-HOOK.

SPECIFICATION forming part of Letters Patent No. 504,686, dated September 5, 1893.

Application filed February 20, 1893. Serial No. 463,033. (No model.)

*To all whom it may concern:*

Be it known that I, WILLIAM J. STOWE, of Kansas City, in the county of Jackson and State of Missouri, have invented a certain new and useful Improvement in Whiffletree-Hooks, of which the following is a full, clear, and exact description, reference being had to the accompanying drawings, forming part of this specification.

My invention consists in novel features of construction as hereinafter described and claimed.

Figure I is a top view or plan, illustrating a whiffletree fitted with my improved hook, the hook being closed. Fig. II is a transverse section, taken on line II—II, Fig. I, through one of the clips. Fig. III is an enlarged, detail top view of the hook, the hook being shown in open position.

Referring to the drawings, 1 represents a whiffletree, and 2 any ordinary center clip.

3 represents a sleeve forming the main body of my improved hook, said sleeve having a horizontal slot at its outer end, in which a hook 4, eccentrically pivoted at 5, near the rear side of the sleeve has bearing and turns; said hook being adapted to move in and out of the horizontal slot in the end of the sleeve. The sleeve 3 is also formed with top and bottom recesses 7 for the reception of the heads 5ᵃ of the pivot-pin 5. The pivot 5 of the hook is located eccentrically at the rear of the center of the sleeve 3, to allow closing the opening of the hook, when the hook is in its forward and using position, whereas when the hook is in its rear and open position the pivot being nearer that side of the sleeve, the point of the hook is outside of the sleeve, and the opening is entirely exposed so that the trace may be inserted or removed.

As illustrated in Fig. I, it will be seen that when the hook is in forward and using position, as there shown, the point of the hook is within the slot of the sleeve, preventing the trace from becoming accidentally released, and in Fig. III it is in the opposite position.

In order to prevent the clip being forced onto the end of the whiffletree to such a distance that the hook would strike against the end of the whiffletree, and thus be prevented from moving its required distance into the slot, I provide a flange or rim 6 within the sleeve 3, which limits the distance to which the sleeve may be driven onto the whiffletree, thus avoiding any interference between the end of the hook and the end of the whiffletree.

I claim as my invention—

A whiffletree-hook comprising a sleeve 3 of nearly equal size from its inner end to its outer end, having a flange 6 within it and formed with an open horizontal slot in its extremity and top and bottom recesses 7, a hook 4, and a pivot-pin 5 whereby the hook is pivoted eccentrically in the slot near the rear side of the sleeve, having heads 5ᵃ occupying the recesses in the sleeve; substantially as described.

WILLIAM J. STOWE.

In presence of—
  E. S. KNIGHT,
  ALBERT M. EBERSOLE.